(12) United States Patent
Harris (10) Patent No.: US 7,352,498 B2
(45) Date of Patent: Apr. 1, 2008

(54) OPTICAL IMAGE SCANNER WITH ADJUSTABLE OBJECT PLANE

(75) Inventor: Rodney Carl Harris, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1093 days.

(21) Appl. No.: 10/638,774

(22) Filed: Aug. 11, 2003

(65) Prior Publication Data

US 2005/0036176 A1 Feb. 17, 2005

(51) Int. Cl.
*H04N 1/04* (2006.01)
(52) U.S. Cl. .................. 358/497; 358/483; 358/486; 358/488
(58) Field of Classification Search ........... 358/497, 358/494, 474, 471, 486, 488, 483, 482, 505, 358/506, 487; 382/312; 250/234–236, 208.1; 399/211
See application file for complete search history.

(56) References Cited

U.S. PATENT DOCUMENTS

| | | | |
|---|---|---|---|
| 4,972,268 A | 11/1990 | Frederick et al. | |
| 5,362,958 A * | 11/1994 | Ando | 250/208.1 |
| 5,446,276 A * | 8/1995 | Iyoda et al. | 250/208.1 |
| 5,999,277 A | 12/1999 | Tsai | |
| 6,301,061 B1 * | 10/2001 | Lin | 359/726 |
| 6,512,602 B1 * | 1/2003 | Sheng et al. | 358/498 |
| 6,603,514 B1 * | 8/2003 | Tsai et al. | 348/345 |
| 6,940,063 B2 * | 9/2005 | Spears et al. | 250/234 |
| 6,989,915 B2 * | 1/2006 | Honjo et al. | 358/461 |
| 7,055,743 B2 * | 6/2006 | Youngers | 235/454 |
| 7,119,934 B2 * | 10/2006 | Yoshida et al. | 358/487 |
| 7,170,649 B2 * | 1/2007 | Chang | 358/474 |
| 7,215,447 B2 * | 5/2007 | Liu | 358/474 |

FOREIGN PATENT DOCUMENTS

| | | |
|---|---|---|
| DE | 2754052 | 6/1979 |
| DE | 19819992 | 11/1999 |
| GB | 2379822 | 3/2003 |
| GB | 2379822 A | 3/2003 |
| JP | 2260760 A | 10/1990 |
| JP | 7226829 | 8/1995 |

OTHER PUBLICATIONS

GB Search Report (Application No. GB0417501.4); dated Dec. 15, 2004.

\* cited by examiner

*Primary Examiner*—Cheukfan Lee

(57) ABSTRACT

Cam-operated focus shift in an optical image scanner is provided. One embodiment comprises a method of adjusting the location of an object plane above a platen to be scanned by an optical head. Briefly described, one such method comprises rotating a cam-shaped spacer that is functionally disposed between the platen and the optical head.

20 Claims, 8 Drawing Sheets

OPTICAL IMAGE SCANNER WITH ADJUSTABLE OBJECT PLANE

BACKGROUND

Optical image scanners, also known as document scanners, convert a visible image (e.g., on a document or photograph, an image in a transparent medium, etc.) into an electronic form suitable for copying, storing, or processing by a computer. An optical image scanner may be a separate device, or an image scanner may be a part of a copier, part of a facsimile machine, or part of a multipurpose device. Reflective image scanners typically have a controlled source of light, and light is reflected off the surface of a document, through an optics system, and onto an array of photosensitive devices (e.g., a charge-coupled device, complimentary metal-oxide semiconductor (CMOS), etc.). Transparency image scanners pass light through a transparent image (e.g., a photographic positive slide), through optics, and then onto an array of photosensitive devices. The optics focus at least one line, called a scanline, of the image being scanned onto the array of photosensitive devices. The photosensitive devices convert received light intensity into an electronic signal. An analog-to-digital converter converts the electronic signal into computer readable binary numbers, with each binary number representing an intensity value.

There are two common types of optical image scanners. In a first type, a single reduction lens system is commonly used to focus the scanline onto the photosensor array, and the length of the photosensor array is much less than the length of the scanline. In a second type, an array of many lenses is used to focus the scanline onto the photosensor array, and the length of the photosensor array is the same length as the scanline. For the second type, it is common to use Selfoc® lens arrays (SLA) (available from Nippon Sheet Glass Co.), in which an array of rod-shaped lenses is used, typically with multiple photosensors receiving light through each individual lens.

Depth of focus refers to the maximum distance that the object position may be changed while maintaining a certain image resolution (i.e., the amount by which an object plane may be shifted along the optical path with respect to some reference plane and introduce no more than a specified acceptable blur). The depth of focus for lens arrays is typically relatively short in comparison to scanners using a single reduction lens system. Typically, flat documents are forced by a cover against a transparent platen for scanning, so depth of focus is not a problem. However, there are some situations in which the surface being scanned cannot be placed directly onto a platen. One example is scanning 35 mm slides. A typical frame for a 35 mm slide holds the surface of the film about 0.7-1.5 mm above the surface of the platen. As a result, slides may be slightly out of focus when using lens arrays that are focused at the surface of the platen. Another example is scanning books or magazines where part of a page being scanned curves into a binding spline and causes part of the surface being scanned to be positioned above the transparent platen. A large depth of focus is needed to sharply image the binding spline.

SUMMARY

One embodiment of the present invention is a method of adjusting the location of an object plane above a platen to be scanned by an optical head. One such method comprises rotating a cam-shaped spacer that is functionally disposed between the platen and the optical head.

Another embodiment is an optical image scanner comprising a platen, an optical head, and a cam-shaped spacer functionally disposed between the platen and the optical head. The cam-shaped spacer is adapted to change the distance between the optical head and the platen when the cam-shaped spacer is rotated.

A further embodiment comprises a method for scanning an object disposed above a platen to be scanned by an optical head. One such method comprises: providing a cam-shaped spacer between the platen and the optical head for adjusting the distance between the platen and the optical head; and translating the optical head by engaging the cam-shaped spacer.

BRIEF DESCRIPTION OF THE DRAWINGS

Many aspects of the invention can be better understood with reference to the following drawings. The components in the drawings are not necessarily to scale, emphasis instead being placed upon clearly illustrating principles in accordance with the present invention. Moreover, in the drawings, like reference numerals designate corresponding parts throughout the several views.

DETAILED DESCRIPTION

This disclosure relates to various embodiments of optical image scanners. These embodiments comprise various mechanisms for adjusting the optical focal point of the optical head based on operation of a cam that is functionally disposed between the optical head and a transparent platen on which an object to be scanned may be located. Various embodiments will be described below with reference to FIGS. 1-15. As an introductory matter, however, the optical focal point of an optical head may be adjusted in order to more effectively scan certain types of objects. For example, the optical focal point of an optical head may be shifted by adjusting the distance between the optical head and the transparent platen. In this manner, the optical head may scan objects located at different object planes relative to the platen. In certain embodiments, the focal point may be adjusted by functionally disposing a cam-shaped spacer between the optical head and the platen. As the cam-shaped spacer is rotated (and the optical head is mechanically referenced to the platen), the distance between the platen and the optical head may be adjusted to focus the optical head at different object planes.

Figure 1A:
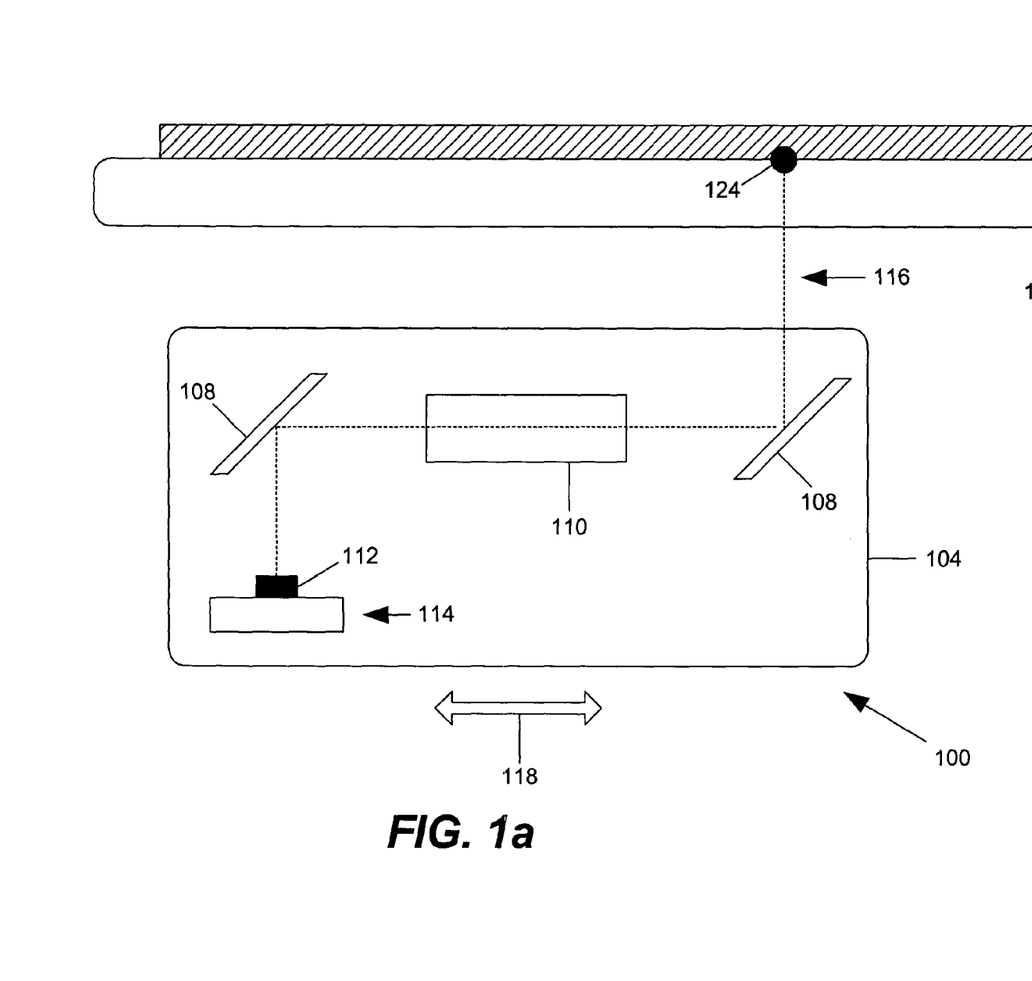
FIG. 1a is a cross-sectional view of an embodiment of an optical image scanner that employs a cam-operated focus shift mechanism.
Figure 1B:
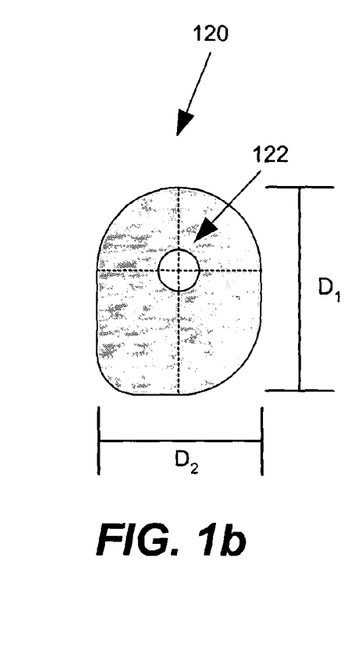
FIG. 1b is a cross-sectional view of an embodiment of a cam that may be employed in the optical image scanner of FIG. 1a to adjust the focal point of the optical head.

FIG. 1a is a cross-sectional view of an embodiment of an optical image scanner 100, which employs a cam-operated focus shift mechanism (e.g., cam-shaped spacer 120—FIG. 1b). As shown in FIG. 1a, optical image scanner 100 comprises an optical head 104 (also known as a carriage) positioned relative to a transparent platen 102. An object such as a document 106 may be placed on the top surface of the platen 102 for scanning. Optical image scanner 100 may be included within an optical image scanner (e.g., a low profile flatbed scanner), a facsimile machine, copier, or other electronic device.

As further illustrated in FIG. 1a, optical head 104 comprises a first reflective surface 108 (e.g., mirror, etc.), a lens array 110, a second reflective surface 108, and an image sensor module 114. Image sensor module 114 may comprise, for example, a printed circuit assembly or any other semiconductor device. Image sensor module 114 also includes a photosensor array 112, which may be any type of device configured to receive optical signals and convert the light intensity into an electronic signal. For example, photosensor array 112 may comprise a charge-coupled device (CCD), complimentary metal-oxide semiconductor (CMOS), or other device known in the art.

Lens array 110 may comprise an array of rod-shaped lenses which have a relatively short depth of focus. For example, lens array 110 may comprise a Selfoc® lens array (SLA), which is manufactured and sold by Nippon Sheet Glass Co. of Somerset, N.J. A rod-lens array may comprise at least one row of graded-index micro lenses, which may be equal in dimensions and optical properties. The lenses may be aligned between two fiberglass-reinforced plastic (FRP) plates. Because FRP has a coefficient of thermal expansion equal to glass, thermal distortion and stress effects are minimal. The FRP also increases mechanical strength of the SLA. The interstices may be filled with black silicone to prevent flare (crosstalk) between the lenses and protect each individual lens.

Referring again to FIG. 1a, as a document 106 is being scanned by optical head 104, an optical signal 116 is reflected off the document 106 and towards the first reflective surface 108 to an object plane 124. The first reflective surface 108 directs the optical signal 116 through the lens array 110 to be focused. The optical signal 116 may also be reflected toward image sensor module 114 by an optional second reflective surface 108. The optical signal 116 is received by photosensor array 112 and converted into an electronic signal that may be processed by an analog-to-digital converter, digital signal processor, or other device In this manner, the optics within optical head 104 focus a portion of an image of document 106 onto photosensor array 112. For instance, in order to alter the cross-sectional profile of optical head 104, second reflective surface 108 may be removed and the image sensor module 114 may be perpendicularly oriented to the optical axis of lens array 110 to receive optical signal 116. Alternatively, the optical axis of lens array 110 may be perpendicularly oriented to platen 102 to direct light through lens array and onto photosensor array 112. The particular orientation of lens array 110 is not relevant and various other configurations may be employed.

The optical components within optical head 104 focus at least one line (i.e., a scanline) of the image being scanned onto photosensor array 112. As known in the art, scanning of the entire image may be accomplished by translating optical head 104 relative to document 106 (e.g., by using cables, drive belt, etc.) as indicated by reference number 118.

As mentioned above, due to the relatively small depth of focus of lens array 110, existing optical image scanners may produce blurred images of documents 106 that are positioned a small distance above the primary focal point of lens array 110. For example, existing optical image scanners may be configured with the primary focal point at a relatively short distance, $H_0$, above the top surface of platen 102. When a document 106, such as a sheet of paper, is positioned on platen 102, the document may be located approximately the distance $H_0$ above the top surface of platen 102 or within the relatively small range of the depth of focus. However, if the document 106 is positioned at an object plane that is outside of a range of acceptable focus, existing optical image scanners may produce a blurred image. For instance, various types of documents (or portions of the document) may be located at an object plane outside of the range of acceptable focus when positioned on platen 102. Such documents may comprise, for example, 35 mm slides, transparencies, photographs, books, and magazines.

Various embodiments of optical image scanner 100 enable multiple object planes to be scanned. Optical image scanner 100 provides a means for shifting the primary focal point of lens array 110 relative to the top surface of platen 102. For instance, a cam-operated focus shift mechanism (e.g., cam-shaped spacer 120—FIG. 1b) may be employed. In this manner, optical image scanner 100 may generate focused images of various types of documents 106 positioned at multiple object planes.

As mentioned above, optical image scanner 100 shifts the primary focal point of lens array 110 by adjusting the distance between optical head 104 and platen 102 based on the rotation of a cam (e.g., cam-shaped spacer 120—FIG. 1b). As used herein, a cam is a mechanism that communicates motion to a follower by means of a mechanical configuration. A cam may be functionally disposed between optical head 104 and platen 102. As the cam is rotated (and optical head 104 is mechanically referenced to platen 102), the distance between optical head 104 and platen 102 may be adjusted based on the surface of the cam and, thereby, shift the primary focal point of lens array 110.

Figure 2A:
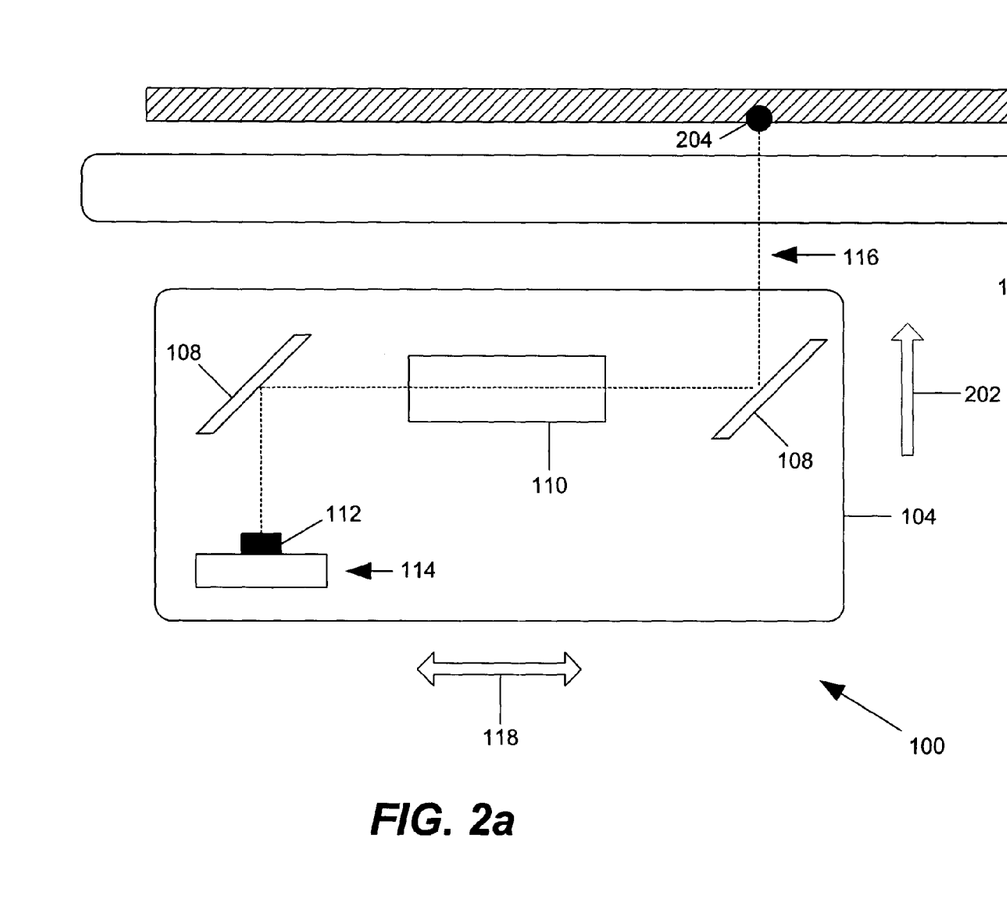
FIG. 2a is a cross-sectional view of the optical image scanner of FIG. 1a, which illustrates the optical head raised relative to the platen.
Figure 2B:
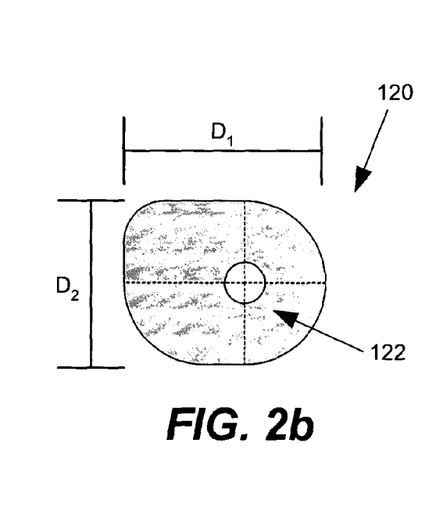
FIG. 2b is a cross-sectional view of the cam of FIG. 1b rotated ninety degrees in a clockwise direction.

Referring to FIGS. 1b and 2b, a cam-shaped spacer 120 may be functionally disposed between optical head 104 and platen 102. Cam-shaped spacer 120 may include a rotational axis 122 about which the cam rotates. As illustrated in FIGS. 1b and 2b, cam-shaped spacer 120 may define two diameters ($D_1$, and $D_2$) relative to axis 122.

As mentioned above, optical head 104 may be mechanically referenced to platen 102 by, for example, one or more biasing or resilient members, such as a spring assembly or other non-spring loaded means. The mechanical reference and the functional disposition of cam-shaped spacer 120 between optical head 104 and platen 102 enables the rotation of cam-shaped spacer 120 to determine the distance between optical head 104 and platen 102 (which remains stationary).

In the embodiment illustrated in FIGS. 1 and 2, cam-shaped spacer 120 is configured to focus optical head 104 at two object planes (124 and 204) based on rotation about axis 122. When cam-shaped spacer 120 is functionally positioned between optical head 104 and platen 102 as illustrated in FIG. 1b (e.g., where diameter $D_1$ is perpendicular to the top surface of optical head 104 and the lower surface of platen 102), the primary focal point of lens array 110 may be located at object plane 124. In this position, optical head 104 is located in a lower position relative to platen 102. In other words, the distance between optical head 104 and platen 102 is increased, thereby shifting the primary focal point of lens array 110 to an object plane closer to the top surface of platen 102.

When cam-shaped spacer 120 is rotated to the position illustrated in FIG. 2b (e.g., where the shorter diameter $D_2$ is perpendicular to the top surface of optical head 104 and the lower surface of platen 102), the primary focal point of lens array 110 may be shifted to object plane 204. In other words, optical head 104 is raised relative to platen 102, which decreases the distance between optical head 104 and platen 102, thereby shifting the primary focal point of lens array 110 to an object plane 204 that is a greater distance ($H_0$) from the top surface of platen 102.

Rotation of the cam (e.g., cam-shaped spacer 120) may be provided in a number of ways. For instance, in certain embodiments, the cam may be rotated by an electric means, such as an electric motor, solenoid, actuator, or other electronic device. In additional embodiments, the rotation of the cam may be entirely provided by a mechanical means. Nonetheless, any combination of electrical and mechanical (or other) means may be employed to provide the rotation. The cam may also be rotated by a discrete manual action initiated by an operator of optical image scanner 100.

In further embodiments, the rotation may be "automatically" provided when a scanning accessory is installed. Optical image scanner 100 may be configured to receive a scanning module, adapter, accessory, etc. that may be used to scan a particular type of a object. Certain types of objects (e.g., transparency, 35 mm slide, etc.) may be more difficult to effectively scan by placing them directly on platen 102. In these or other instances, a user may install a scanning accessory with optical image scanner 100 to improve the scanning process. One of ordinary skill in the art should appreciate that optical image scanner 100 and the scanning accessory may be designed so that the cam is automatically rotated to the appropriate position when the corresponding scanning accessory is installed.

Figure 3:
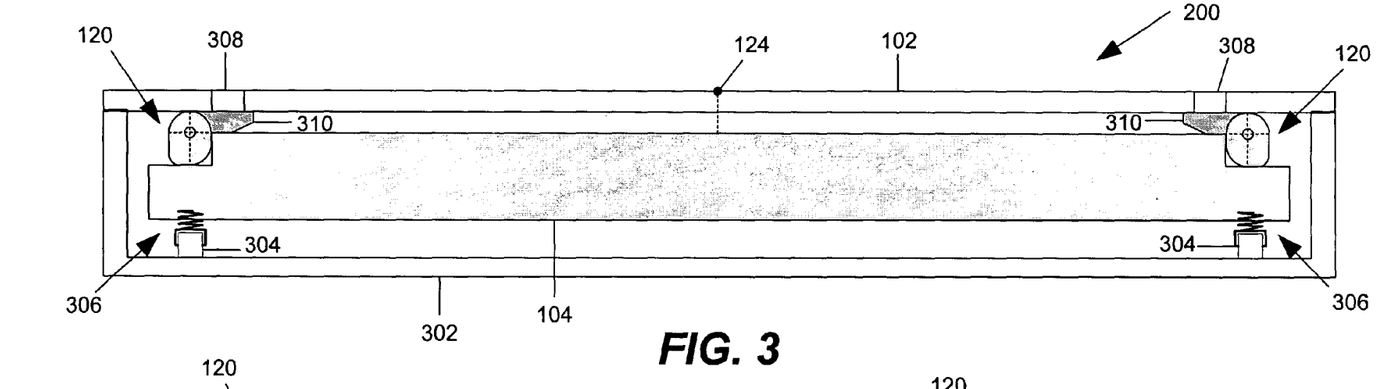
FIG. 3 is a cross-sectional view of another embodiment of an optical image scanner that employs a cam-operated focus shift mechanism.
Figure 4:
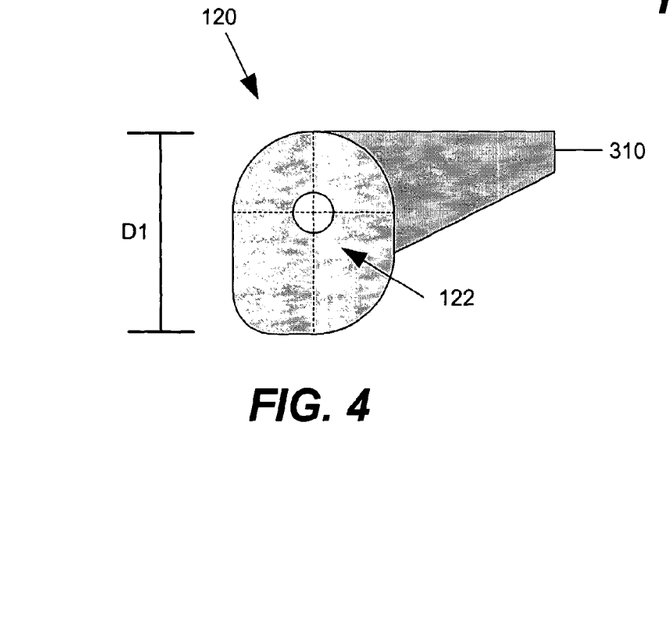
FIG. 4 is a cross-sectional view of another embodiment of a cam assembly that may be employed in the optical image scanner of FIG. 3 to adjust the focal point of the optical head.
Figure 5:
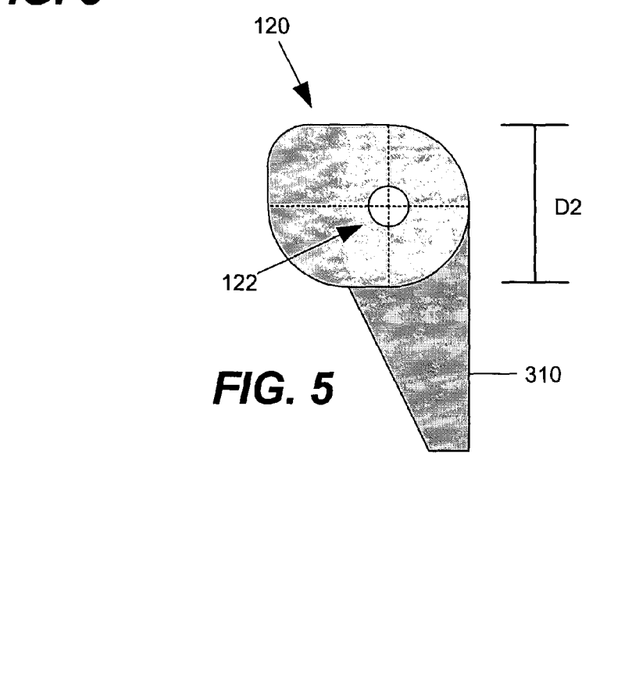
FIG. 5 is a cross-sectional view of the cam assembly of FIG. 4 rotated ninety degrees in a clockwise direction.
Figure 6:
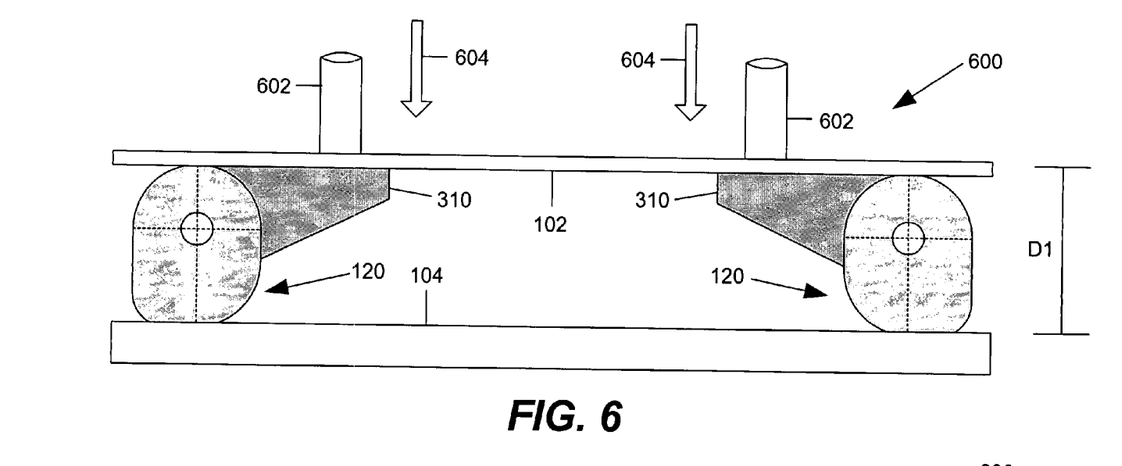
FIG. 6 is a cross-sectional view of another embodiment of an optical image scanner that employs a cam-operated focus shift mechanism.
Figure 7:
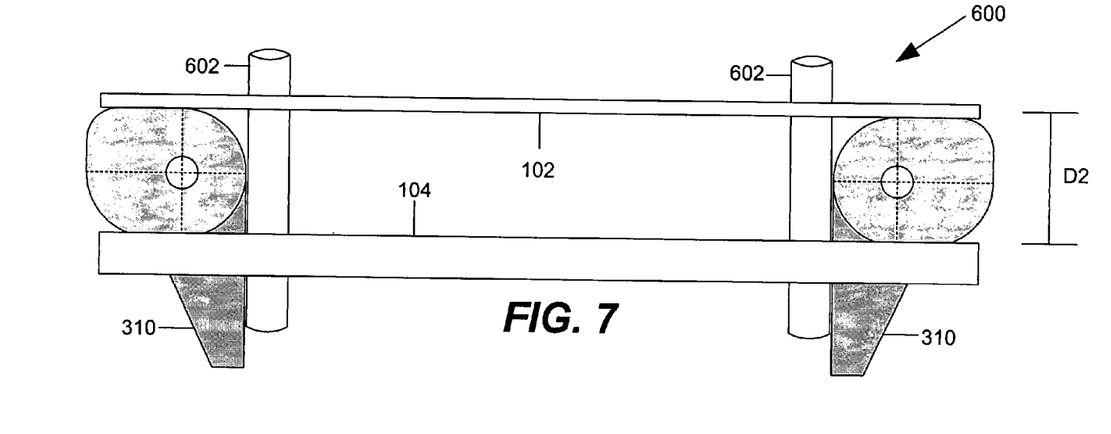
FIG. 7 is cross-sectional view of the optical image scanner of FIG. 6, in which the cam assemblies have been rotated.

FIGS. 3-5 illustrate the operation of another embodiment of an optical image scanner 200 in which a pair of cam-shaped spacers 120 are employed to adjust the focal point of an optical head. As illustrated in FIG. 3, optical image scanner 200 is a low-profile, flatbed scanner. Optical image scanner 200 comprises an optical head 104 located below a transparent platen 102 inside a housing 302. Optical head 104 is supported from below by two spring-loaded assemblies located near each end of optical head 104. Each spring-loaded assembly comprises a roller 304 that engages housing 302 and a spring 306 that provides a mechanical reference for maintaining optical head 104 pressed against two cam-shaped spacers 120 located at corresponding ends of optical head 104 and, in turn, cam-shaped spacers 120 pressed against the lower surface of platen 102. Rollers 304 remain engaged with housing 302 as optical head 104 is translated during the scanning process. Cam-shaped spacers 120 may be supported by bearing(s) to enable rotation about axes 122 (FIGS. 4, 5). As mentioned above, other biasing and/or resilient member(s) may be employed (e.g., spring-loaded, non-spring-loaded, etc.).

Cam-shaped spacers 120 may comprise longitudinal bar members that extend longitudinally along the top surface of optical head 104. Cam-shaped spacers 120 are configured so that, as they rotate, the upper cam surface maintains a relatively firm engagement with the lower surface of platen 102, and the lower cam surface moves up and/or down relative to the lower surface of platen 102. As further illustrated in FIG. 3, a lever 310 is rigidly attached to one end of the corresponding cam-shaped spacer 120. Levers 310 are configured so that a force may be applied in order to rotate cam-shaped spacers 120.

As mentioned above, this arrangement enables optical image scanner 200 to adjust the relative distance between platen 102 and optical head 104 based on rotation of cam-shaped spacers 120 and, thereby, adjust the primary focal point of the optics contained within optical head 104. The application of a force to levers 310 rotates cam-shaped spacers 120. FIGS. 4 and 5 illustrate the motion of the cam-shaped spacer located at the left side of optical image scanner 200 when lever 310 is engaged. Prior to engagement of lever 310 (FIG. 4), cam-shaped spacer 120 is arranged so that optical head 104 is separated from platen 102 by a distance equal to diameter $D_1$. In this configuration, the focal point of optical head 104 may be located at object plane 124 (FIG. 3). After lever 310 is engaged and cam-shaped spacer 120 is rotated ninety degrees in a clockwise direction (FIG. 5), cam-shaped spacer 120 is arranged so that optical head 104 is separated from platen 102 by a distance equal to diameter $D_2$. In this manner, optical head 104 is moved closer to the lower surface of platen 102 and the focal point may be shifted to an object plane located farther away from platen 102.

As mentioned above, the force applied to levers 310 may be provided in a number of ways. In the embodiment illustrated in FIGS. 6 and 7, levers 310 may be engaged by corresponding rods 602. In this embodiment, optical image scanner 600 includes holes 308 (FIG. 3) located in platen 102 above levers 310. Holes 308 enable rods 602 to be inserted through platen 102 to engage levers 310 and, thereby, rotate cam-shaped spacers 120 between the positions illustrated in FIGS. 6 and 7. Rods 602 may be used by an operator to manually control rotation of cam-shaped spacers 120. In alternative embodiments, rods 602 may be integrated with a scanning accessory to automatically rotate cam-shaped spacers 120 when the scanning accessory is installed by a user. In this manner, the focal point of optical head 104 may be automatically positioned to the corresponding focal point for scanning a particular type of object (e.g., transparency, 35 mm slide, etc.).

Figure 8:
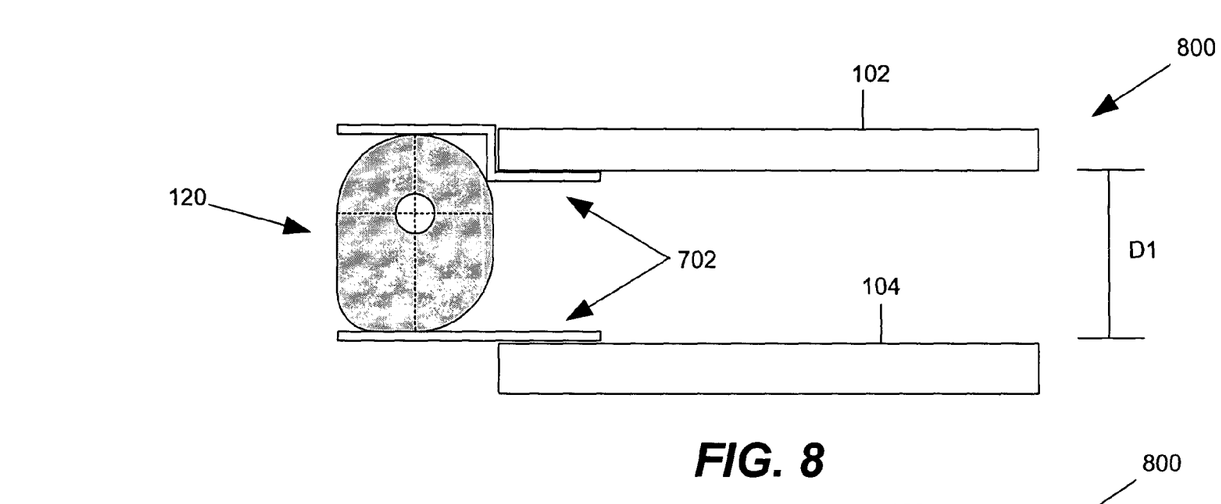
FIG. 8 is a cross-sectional view of a further embodiment of an optical image scanner that employs a cam-operated focus shift mechanism.
Figure 9:
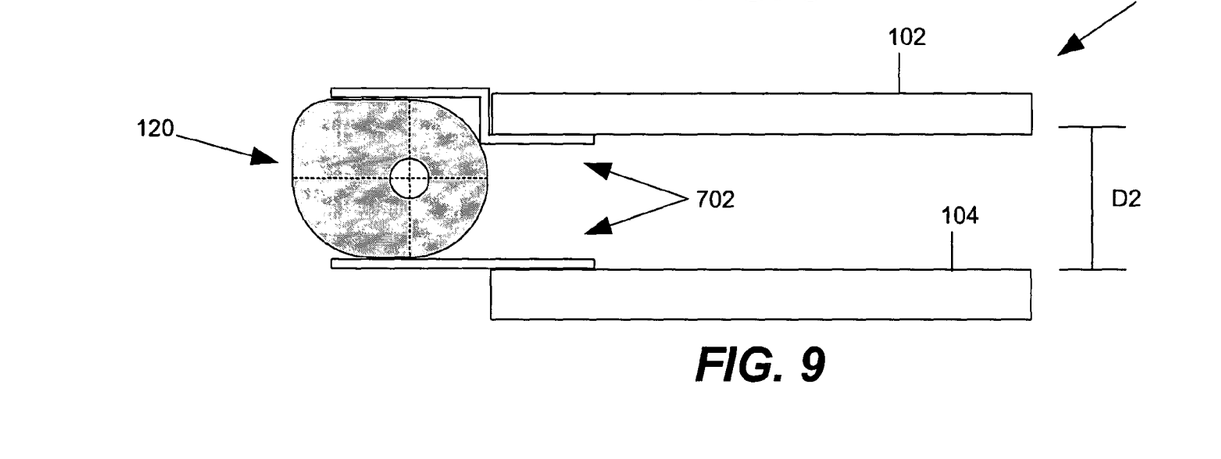
FIG. 9 is a cross-sectional view of the optical image scanner of FIG. 8, in which the cam has been rotated.

Referring to FIGS. 8 and 9, cam-shaped spacers 120 need not be physically disposed between optical head 104 and platen 102. In certain embodiments, cam-shaped spacer(s) 120 may be located to the side of platen 102 and/or optical head 104 in order to reduce the stack height of the assembly by moving the vertical height of cam-shaped spacer(s) 120 outside the material stack. In this arrangement, cam-shaped spacer(s) 120 may still be functionally disposed between optical head 104 and platen 102 by introducing elements 702 between optical head 104 and platen 102. Elements 702 may extend to the side of platen 102 and/or optical head 104 in any of a number of configurations. As illustrated in FIGS. 8 and 9, cam-shaped spacer(s) 120 may be physically disposed between the portion of elements 702 that extend to the side of platen 102 and/or optical head 104. Cam-shaped spacer(s) 120 may be rotated in the manner described above to adjust the vertical position of optical head 104 relative to platen 102 and, thereby, shift the focal point of optical head 104.

In alternative embodiments of optical image scanner 800 (FIGS. 8 and 9), a single element 702 may be employed that extends to the side of platen 102. In this configuration, the upper surface of optical head 104 may extend farther than platen 102 to provide the lower mechanical reference for cam-shaped spacer(s) 120.

Figure 10:
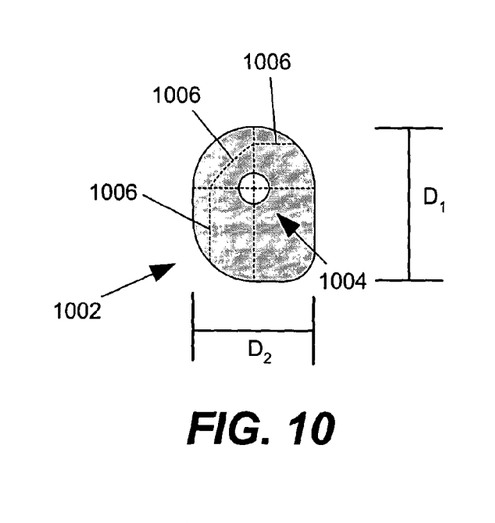
FIG. 10 is a cross-sectional view of another embodiment of a cam that may be implemented in an optical image scanner to adjust the focal point of the optical head.
Figure 11:
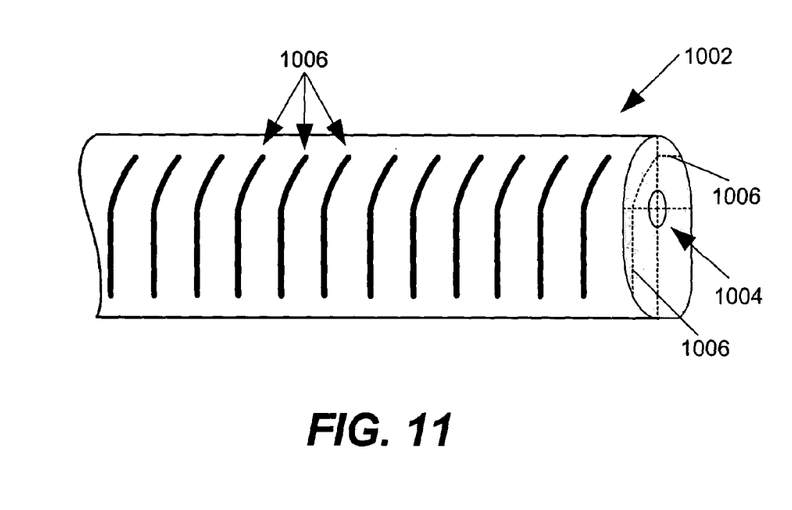
FIG. 11 is a partial side view of the cam of FIG. 10.

As mentioned above, a number of types of cams may be implemented in an optical image scanner to adjust the focal point of the optical head based on the rotation of the cam. FIGS. 10 and 11 illustrate another embodiment of a cam-shaped spacer 1002 for providing cam-operated focus shift in an optical image scanner. The cross-sectional profile of cam-shaped spacer 1002 may be configured in much the same manner as described above. Cam-shaped spacer 1002 comprises a longitudinal bar member having gear teeth defined by recesses 1006 arranged along the longitudinal axis of cam-shaped spacer 1002 to form a gear rack. As described in more detail below, the gear rack may be operationally integrated with a pinion gear in a drive system to provide for the translation of the optical head (arrow 118—FIG. 1a) during a scan process. By integrating the translation mechanism with the focus shift mechanism (i.e., cam-shaped spacer 1002), the tolerance stack of the optical image scanner may be enhanced. Furthermore, it should be appreciated that this arrangement enables the position of the pinion gear relative to the gear rack to be independent of the position of optical head 104 relative to housing 302 and/or platen 102.

Figure 12:
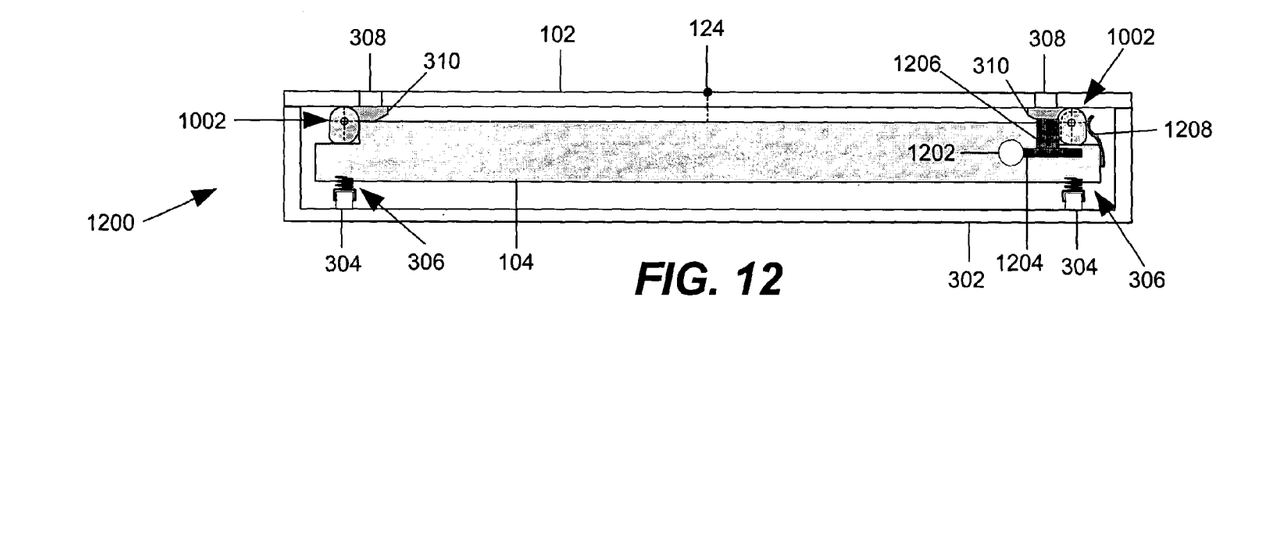
FIG. 12 is a cross-sectional view of another embodiment of an optical image scanner, in which the cam of FIGS. 10 and 11 may implemented.
Figure 13:
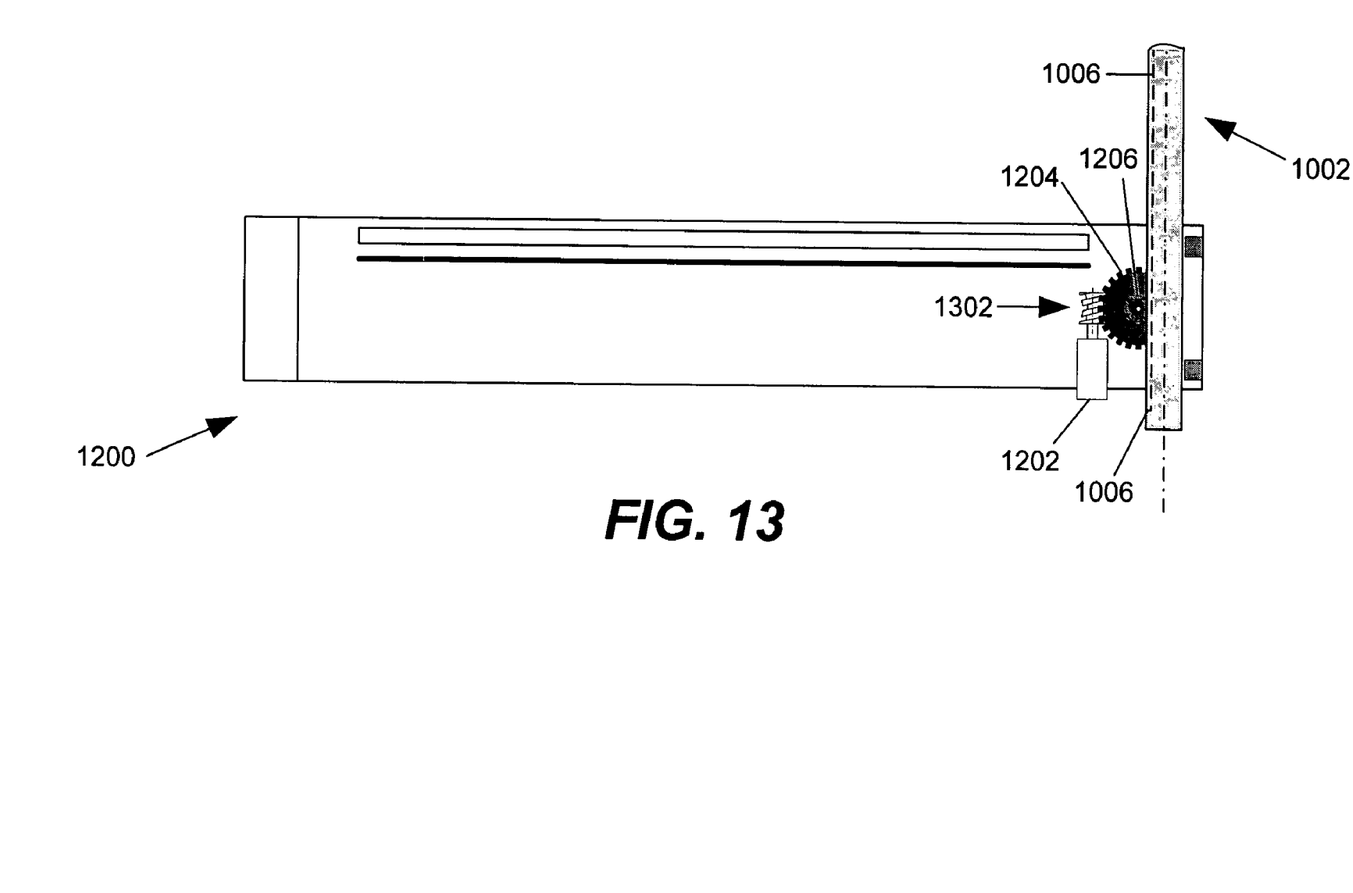
FIG. 13 is a partial overhead view of the optical image scanner of FIG. 12.
Figure 14:
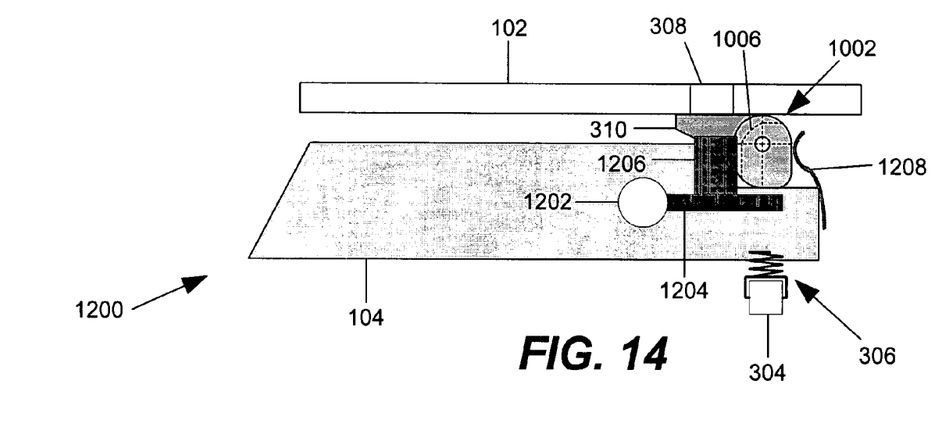
FIG. 14 is a magnified view of FIG. 12 illustrating the engagement of the pinion gear with the cam of FIGS. 10 and 11.
Figure 15:
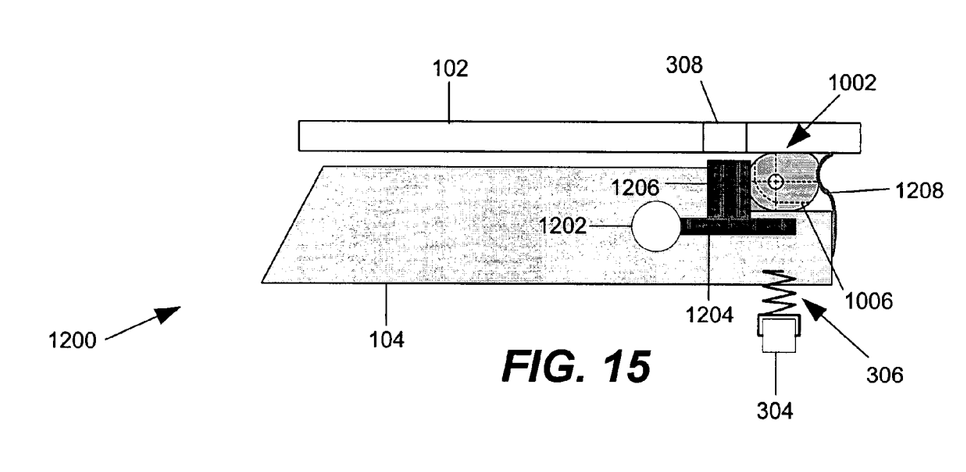
FIG. 15 is another view of FIG. 14, in which the cam has been rotated.

Referring to FIGS. 12-15, the engagement of the gear rack (cam-shaped spacer 1002) and the translation mechanism will be described in more detail. As illustrated in FIG. 12, cam-shaped spacer(s) 1002 may be implemented in an optical image scanner 1200. Optical image scanner 1200 may be configured in much the same manner as described above. Optical image scanner 1200 further includes a motor 1202, a worm gear 1302 (FIG. 13), and a wheel gear 1204. As illustrated in FIGS. 12-15, motor 1202 drives wheel gear 1204. Wheel gear 1204 may include a coaxial spur gear 1206 which engages the gear rack of cam-shaped spacer 1002. Optical image scanner 1200 may further include a spring-loaded retainer 1208 for maintaining optical head 104 and spur gear 1206 engaged with cam-shaped spacer 1002.

In this manner, during a scan operation, motor 1202 may be engaged to initiate translation of optical head 104. Motor 1202 drives worm gear 1302 and wheel gear 1204, which causes spur gear 1206 to engage the gear rack. As spur gear 1206 engages the gear rack, optical head 104 may be translated along the longitudinal axis of cam-shaped spacer 1002.

Cam-shaped spacer 1002 may also be rotated in the manner described above to adjust the vertical distance between optical head 104 and platen 102.

What is claimed is:

1. An optical image scanner comprising:
   a platen;
   an optical head; and
   a cam-shaped spacer disposed between the platen and the optical head for adjusting the object plane at which the optical head is focused based on the rotation of the cam-shaped spacer, the cam-shaped spacer comprising a plurality of gear teeth for engaging a gear that translates the optical head.

2. The optical image scanner of claim 1, wherein the cam-shaped spacer is rotateable to adjust the object plane to a plurality of different locations.

3. The optical image scanner of claim 1, wherein the cam-shaped spacer is shaped to have different diameters relative to a rotational axis.

4. The optical image scanner of claim 1, wherein the gear teeth are arranged along a longitudinal axis to form a gear rack.

5. The optical image scanner of claim 4, wherein the gear teeth are operationally integrated with the gear to provide translation of the optical head.

6. An optical image scanner comprising:
   a platen;
   an optical head; and
   a cam-shaped spacer functionally disposed between the platen and the optical head and adapted to change a distance between the optical head and the platen when the cam-shaped spacer is rotated;
   wherein the cam-shaped spacer comprises a first longitudinal bar member disposed at a first end of the optical head and a second longitudinal bar member disposed at a second end of the optical head, the first and second longitudinal bar members each having a non-uniform, cross-sectional profile.

7. The optical image scanner of claim 6, wherein the optical head is spring-loaded relative to the platen and the cam-shaped spacer.

8. The optical image scanner of claim 6, wherein the cam-shaped spacer comprises a longitudinal bar member.

9. The optical image scanner of claim 6, wherein the first longitudinal bar member is disposed between the optical head and the platen.

10. An optical image scanner comprising:
    a platen;
    an optical head; and
    a cam-shaped spacer functionally disposed between the platen and the optical head and adapted to change a distance between the optical head and the platen when the cam-shaped spacer is rotated; and
    a linkage arm attached to the cam-shaped spacer for rotating the cam-shaped spacer;
    wherein the linkage arm is positioned below a hole in the platen such that a focus shift member may be inserted through the hole for rotating the cam-shaped spacer.

11. The optical image scanner of claim 10, wherein the optical head is spring-loaded relative to the platen and the cam-shaped spacer.

12. A method for scanning an object disposed above a platen to be scanned by an optical head, the method comprising:
    providing a cam-shaped spacer between the platen and the optical head for adjusting a distance between the platen and the optical head; and
    translating the optical head by engaging the cam-shaped spacer;
    wherein the translating the optical head comprises translating the optical head by engaging a pinion gear with the cam-shaped spacer.

13. The method of claim 12, further comprising rotating the cam-shaped spacer to adjust an object plane above the platen at which the optical head is focused.

14. The method of claim 12, further comprising rotating the cam-shaped spacer to change the distance between the platen and the optical head.

15. A method for scanning an object disposed above a platen to be scanned by an optical head, the method comprising:

provoding a cam-shaped spacer between the platen and the optical head for adjusting a distance between the platen and the optical head; and translating the optical head by engaging the cam-shaped spacer;

wherein the translating the optical head comprises translating the optical head by engaging a pinion gear with a gear rack integrated with the cam-shaped spacer.

16. The method of claim 15, further comprising rotating the cam-shaped spacer to adjust an object plane above the platen at which the optical head is focused.

17. The method of claim 15, further comprising rotating the cam-shaped spacer to change the distance between the platen and the optical head.

18. A method for scanning an object disposed above a platen to be scanned by an optical head, the method comprising:

providing a cam-shaped spacer between the platen and the optical head for adjusting a distance between the platen and the optical head; and translating the optical head by engaging the cam-shaped spacer;

wherein the translating the optical head comprises translating the optical head by engaging a pinion gear with gear teeth formed in the cam-shaped spacer.

19. The method of claim 18, further comprising rotating the cam-shaped spacer to adjust an object plane above the platen at which the optical head is focused.

20. The method of claim 18, further comprising rotating the cam-shaped spacer to change the distance between the platen and the optical head.

* * * * *